Sept. 16, 1958  J. CZULAK ET AL  2,851,776
CHEESE-CURD FUSING MACHINE
Filed March 25, 1957  3 Sheets-Sheet 1
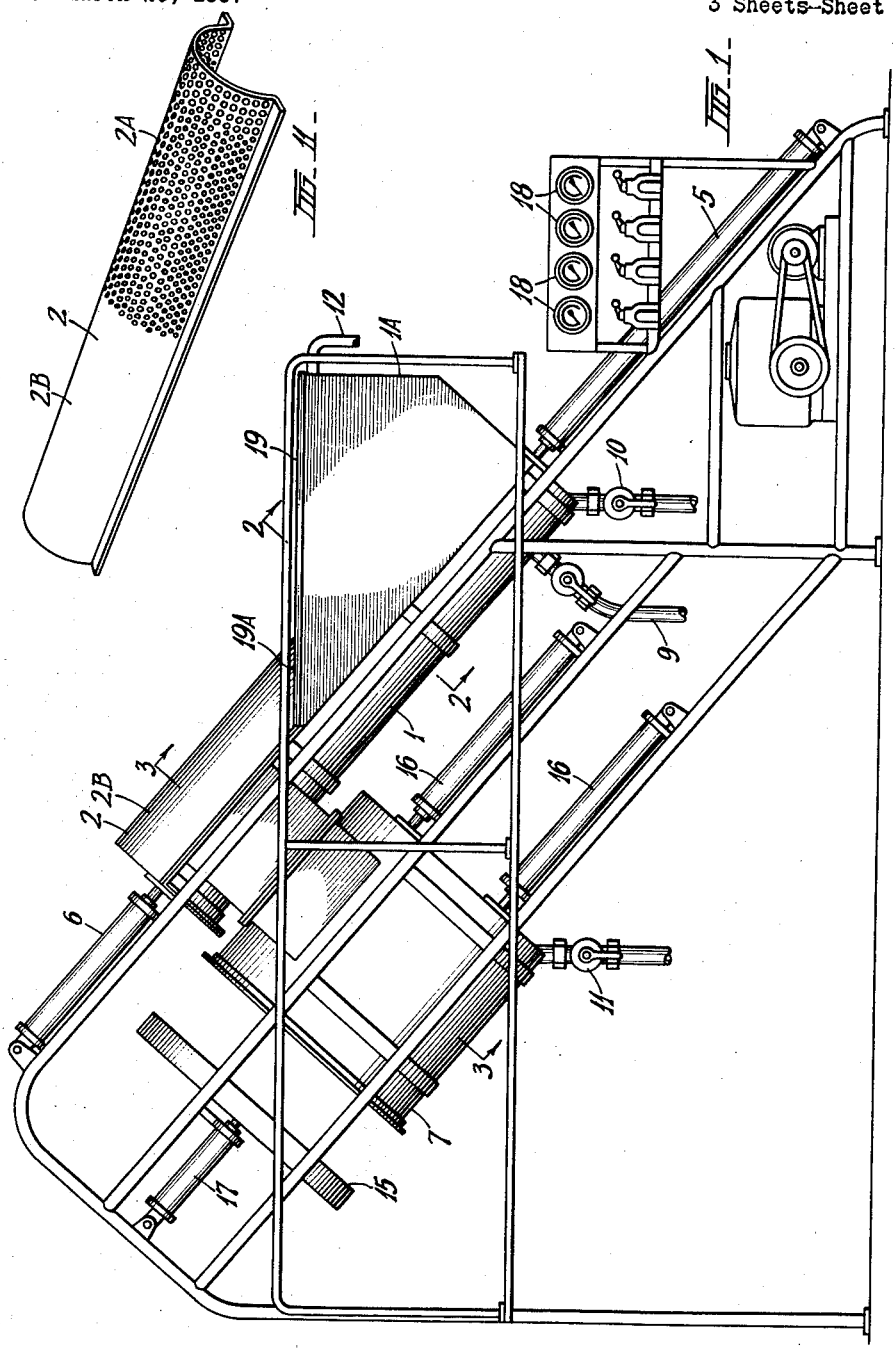

Sept. 16, 1958  J. CZULAK ET AL  2,851,776
CHEESE-CURD FUSING MACHINE
Filed March 25, 1957  3 Sheets-Sheet 2
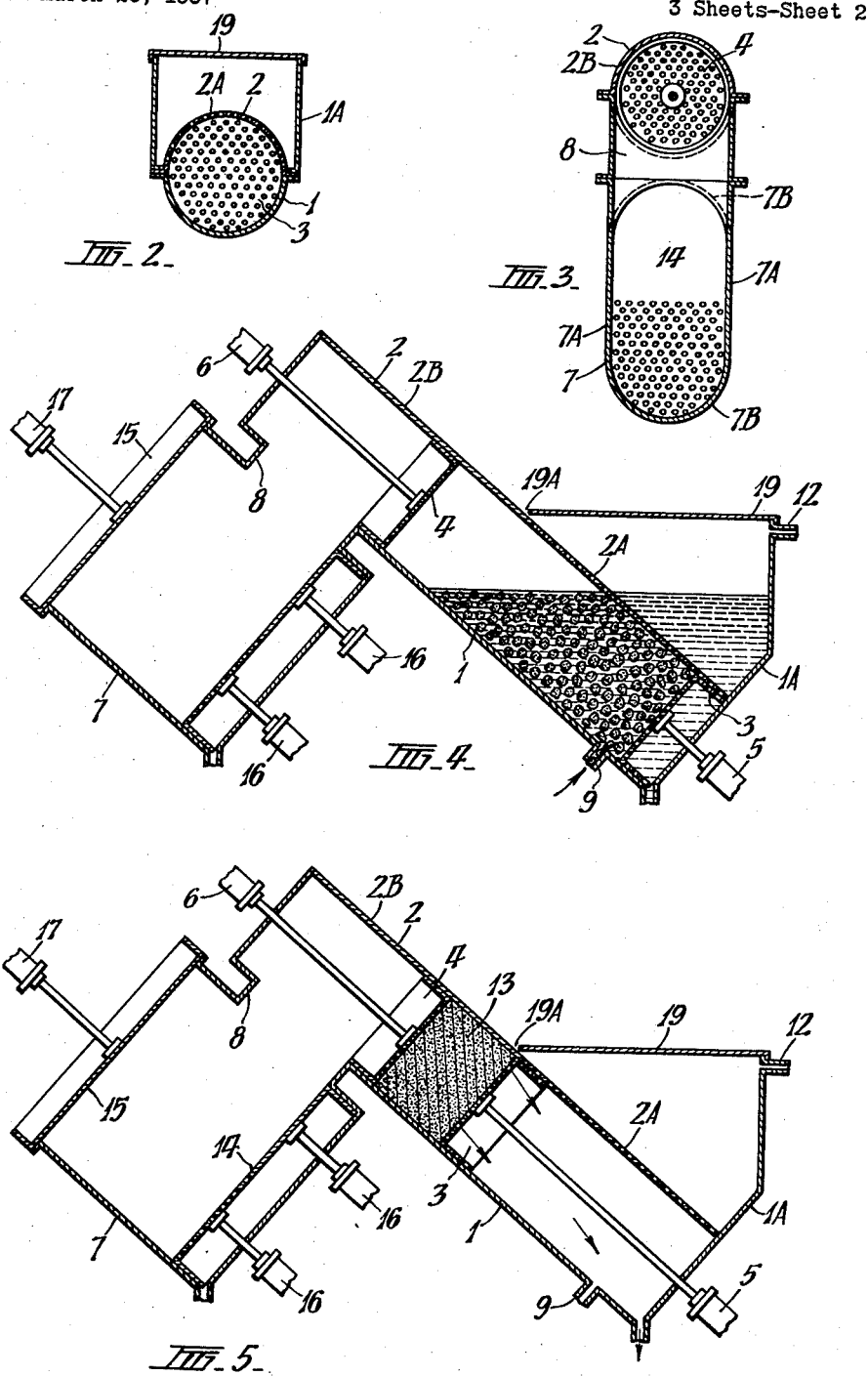

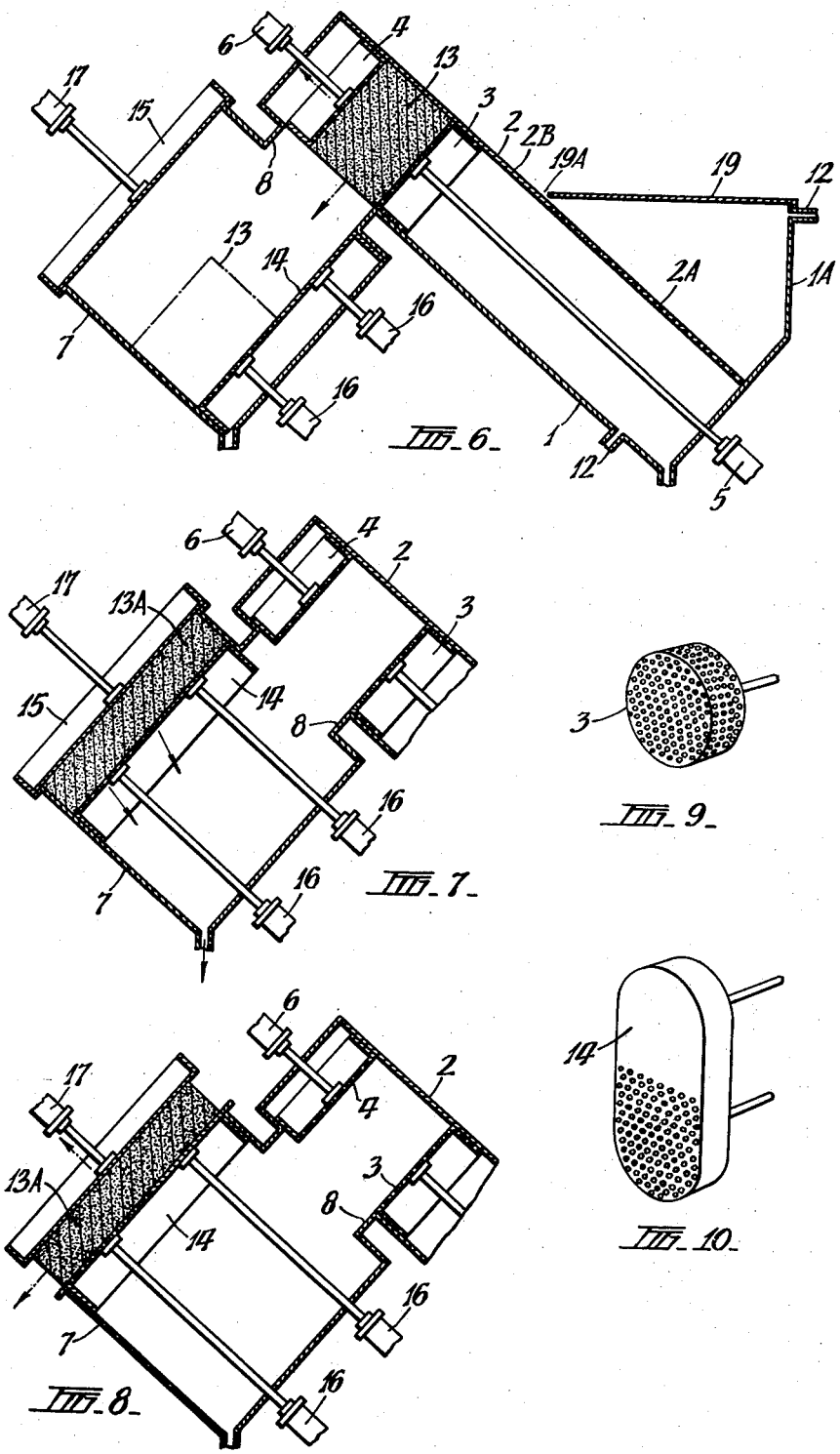

United States Patent Office 2,851,776
Patented Sept. 16, 1958

2,851,776

CHEESE-CURD FUSING MACHINE

Joseph Czulak, Mount Eliza, Victoria, and Leslie Alfred Hammond, Caulfield, Victoria, Australia, assignors to Commonwealth Scientific and Industrial Research Organization, Victoria, Australia, a scientific and industrial research corporation Application March 25, 1957, Serial No. 648,119

Claims priority, application Australia March 26, 1956

9 Claims. (Cl. 31—46)

Our invention relates to a machine for fusing cheese-curd.

One object of our invention is to provide a machine for fusing cheese-curd in the making of cheese of the type in which curd-fusing is called for during the process of manufacture.

Another object of our invention is to provide a machine for fusing cheese-curd in the making of Cheddar cheese.

A further object of our invention is to provide a machine for fusing cheese-curd in the making of Cheddar cheese by the more rapid known processes.

A still further object of our invention is to provide a machine for fusing cheese-curd in the making of Edam cheese.

Still another object of our invention is to provide a machine for fusing cheese-curd, which causes a flow of curd particles similar to what occurs in the normal process of fusing cheese-curd.

We attain these objects, and any other objects and advantages hereinafter disclosed, by the machine illustrated in the accompanying drawings, in which—

Figure 1 is a side elevation of the machine;

Figure 2 is a cross-section on the line 2—2 of Figure 1;

Figure 3 is a cross-section on the line 3—3 of Figure 1;

Figure 4 is a sectional view through two compressing vessels and a whey trough with pistons of the compressing vessels in their initial positions;

Figure 5 is a view similar to Figure 4 but showing the positions of the pistons in the first compressing vessel at the completion of the compression of the curd therein;

Figure 6 is a view similar to Figure 5 but showing the pistons in the first compressing vessel in a more elevated position just before gravitational transfer of the curd 13 to the position shown in dotted lines in the second compressing vessel;

Figure 7 is a view similar to the left-hand portion of Figure 6 but showing the piston of the second compressing vessel moved to the position where the curd has become flattened out;

Figure 8 is a view similar to Figure 7 but showing the pistons of the second compressing vessel moved further upwards so that the curd is in a position where it can be transferred to a conveyor or other receiving means (not shown);

Figure 9 is a detailed view of the lower piston of the first compressing vessel;

Figure 10 is a detailed view of the lower piston of the second compressing vessel; and Figure 11 is a view of a cover portion of the first compressing vessel.

The normal process of cheese-curd fusing will first be explained.

In the making of Cheddar cheese, for example, in any process incorporating the cheddaring stage, after the curd has formed it is cut and allowed to contract by the passing off of whey and eventually the pieces of contracted curd are piled against the sides of the vat where the weight of the cheese causes the particles to commence to fuse together, the blocks as they are forming being turned over in various directions until the curd has fused together into a sufficiently uniform mass. During this process there is not merely a contraction in the height of each block of curd but there is also a lateral flow, especially when a partly formed block is turned on end for if the block of curd is turned on end the direction of flow in the block will naturally be altered. The term "block" is used herein to include a somewhat plastic mass. We have found that this lateral flow produces a flattening of the particles of curd and assists the passing off of air bubbles and whey and thus facilitates the fusing of the particles together and the formation of fibrous structure, without the formation of crevices. In consequence we have realized that in the production of a machine to effect this contraction of the curd it is important to provide for this lateral flow of the particles of curd. This applies to the making not only of Cheddar cheese but also of other cheeses where fusing of the curd takes place during the process of manufacture.

The machine comprises a base trough 1 with a cover 2 which together form a cylindrical compressing vessel, the ends of this vessel being closed by two circular pistons 3 and 4 which are perforated and are operated by hydraulic rams 5 and 6, and the base trough and cover being inclined upwardly (as, for example, at 45°). The lower end portion of the trough 1 forms the base of a deeper trough 1A which is adapted to hold a quantity of whey. The lower end portion 2A of the cover 2 is perforated while its upper end portion 2B is unperforated. A second compressing vessel 7 is inclined similarly to the first compressing vessel and is so positioned that it can receive the block of curd gravitationally from the first compressing vessel, a connecting aperture 8 being provided between the adjacent end portions of the two compressing vessels. The second compressing vessel is of larger cross-section than the first compressing vessel and this cross-section may be provided with parallel walls 7A terminating at each end in half circles 7B the combined area of which half circles may equal the cross-sectional area of the first compressing chamber. Means is provided to pump the slurry of curd and whey through an inlet pipe 9 into the first compressing vessel, and cocks 10, 11 or like means are provided to drain the whey from the lower end portion of each compressing vessel.

The sludge of curd and whey can thus be pumped into the first compressing vessel without air becoming entrapped in said sludge while said compressing vessel is thus being filled with said sludge, and whey can escape sufficiently rapidly from said compressing vessel during inward movement of its piston without allowing air to enter unduly into the block of curd while it is being compressed. The above statements to the effect that the air is excluded from the sludge and curd mean that it is either entirely excluded or that the entrance of air is minimised to such an extent that it has no appreciably deleterious effect upon the final contracted curd.

The level of the whey in the whey trough 1A, and thus in the lower portion of the first compressing vessel, can be regulated as desired by operation of the drainage cock 10. The whey trough will normally be provided also with an overflow pipe 12. By regulating the level of whey in the trough, the curd can be compressed either under the whey or partly or wholly above the whey level, according to the type of curd desired. If the curd is compressed under the whey this minimises the danger of air being entrapped in the curd. As the curd is first compressed in the presence of hot whey the temperature of the machine is thus maintained at the desired level and when the curd is compressed under the whey the presence of the whey also assists in the exclusion of air from the curd. The upward movement of the lower piston eventually compresses the curd 13 into an upper portion of the cylindrical vessel where it is out of contact with the whey in the whey trough. Pressure is then continued and the curd is further compacted and the whey is largely expressed therefrom. The upper piston is then retracted upwardly to relax the pressure and the block of curd is pushed upwardly by the lower piston and then slides down through the connecting aperture 8 into the second compressing vessel 7 wherein it lies against a lower piston 14. These movements of the pistons and of the curd are shown in Figures 4 to 6. When this lower piston is moved upwardly it carries the block of curd with it to a position in the second compressing vessel at which the lower piston has passed beyond the entrance aperture 8 from the first compressing chamber, and the block of curd is then pressed against an upper piston 15 which causes the curd particles to flow laterally (see Figure 7). The pistons 14 and 15 are actuated by hydraulic rams 16 and 17. This lateral flowing movement further assists in removing small air bubbles and whey and promotes the development of a fibrous structure in the curd. After the pressure has been maintained for a sufficient time the upper piston 15 is retracted to relax the pressure and the two pistons are moved upwardly (see Figure 8) to carry the compressed and flattened block of curd 13A to a position from which it slides laterally on to a conveyor belt or the like (not shown). A splash plate 19 formed of stainless steel or other material is adapted to fit on to the top of the whey trough 1A over the perforated portion of the cover of the first compressing vessel and its edge adjacent to the cover 2 is curved to fit against the unperforated portion of the cover, to prevent the splashing of whey during pumping; but sufficient space is left between the splash plate and the portion of the cover which lies beneath it to allow whey to pass freely therethrough. Preferably the splash plate is adapted to slide on to the top of the whey trough.

The hydraulic rams 5, 6, 16 and 17 are provided with pressure gauges 18.

The holes in the perforated portion of the cover of the first compressing vessel may be $3/32''$ diameter at $9/16''$ centres, except that in the portion positioned behind the face of the piston 3 in its fully retracted position the holes are preferably larger and communicate with still larger holes in the skirt of the piston so as to facilitate a rapid outflow of whey. Except for the larger holes thus provided in the skirt of the piston 3, the pistons 3 and 4 are provided with small perforations, as for example of $3/32''$ diameter at $1/2''$ centres. By way of example, a machine capable of treating 100 lbs. of curd per batch may have a cylindrical first compressing vessel of 20'' diameter and the compression may be continued until the block of curd is 17'' long in the direction of movement of the lower piston 3. In the second compressing vessel the longest axis of the cross-section of the vessel may be 40'' and the axis at right angles to the longest axis may be 20''. The thickness of the block at the completion of this second stage may be $7\frac{1}{2}''$.

When making Cheddar cheese in this machine, by one of the more rapid known processes the compression in the first compressing vessel may be continued, for example, for 15–20 minutes and in the second compressing vessel for a further 15–20 minutes. When longer processes of making Cheddar cheese are used in the treatment in each compressing vessel could be extended to ¾–1 hour, for example. When a block of curd has been compressed in the first compressing vessel and has been passed to the second compressing vessel a fresh batch of slurry may be fed to the first compressing vessel so that when a rapid process of making Cheddar cheese is used a batch can pass through the machine about every 15–20 minutes for example.

The accompanying drawings show only one set of these compressing vessels but normally several sets of these compressing vessels (as, for example, ten) will be incorporated in each machine.

A machine contructed according to this invention thus not only carries out the cheese-curd fusing mechanically but it causes the particles of curd to flow laterally and flatten. Another advantage of the machine is that the curd leaves at a level above the entrance to the machine thus providing sufficient headroom for other machines which may be used in subsequent stages of the process. The pressure used in each of the compressing vessels may be from ½ to 7 lbs. per sq. in. The machine does not need to be heated on account of the fact that the whey is sufficiently hot to maintain the necessary temperature. Some whey passes down from the top of the first compressing vessel into the second compressing vessel and so warms up the latter.

The clearances between the pistons and the surrounding wall of each compressing vessel should preferably be less than $1/16''$, but in the second compressing vessel this is sufficient to allow expressed whey to escape; consequently, only the lower portion of the lower piston in the second compressing vessel will normally be perforated. These latter perforations may be of the same size as those in the pistons 3 and 4.

With this construction of machine, the first compressing vessel can be cleaned readily by removing the splash plate and cover. The second compressing vessel, being short and unperforated, is also readily cleaned. It is, of course, very desirable for each compressing vessel to have a smooth internal contour without corners or the like.

We claim:

1. A machine for fusing cheese-curd comprising means forming a first compressing vessel, means connected to said first compressing vessel for feeding a sludge of curd and whey thereto, a piston slidable in said first compressing vessel to compress the curd into a block, means forming a second compressing vessel communicating with said first compressing vessel to receive a compressed block of curd from the latter, said second compressing vessel having a cross-sectional area substantially greater than the cross-sectional area of said first compressing vessel, and a piston slidable in said second compressing vessel to cause the curd of a block received in said second vessel from said first vessel to flow laterally in relation to said piston in the second vessel, thereby developing the essential fibrous structure in the curd and promoting the removal from the curd of small air bubbles and whey.

2. A machine for fusing cheese-curd comprising means forming a first compressing vessel, means connected to said first vessel adjacent one end of the latter for feeding a sludge of curd and whey to said first vessel, said first vessel having an opening adjacent the other end thereof, two opposed pistons slidable in said first vessel so that one of said pistons can be displaced toward the other of said pistons to compress the curd into a block and then said pistons can be displaced together toward said other end of the first vessel for discharge of the compressed block of curd through said opening, means forming a second compressing vessel having a cross-sectional area greater than the cross-sectional area of said first vessel, said second vessel having an opening adjacent one end thereof, means communicating said opening of the first vessel with said opening of the second vessel so that a compressed block of curd discharged from the first vessel can pass to said second vessel, and a piston slidable in said second vessel to cause the curd of a compressed block received in the second vessel to flow laterally in relation to said piston in the latter, thereby developing the essential fibrous structure in the curd and promoting the removal from the curd of small air bubbles and whey.

3. A machine for fusing cheese-curd comprising a first elongated vessel having its longitudinal axis inclined, means connected to the lower end portion of said first vessel for supplying a sludge of curd and whey to said first vessel, a pair of opposed perforated pistons slidable longitudinally in said first vessel so that one of said pistons can be initially moved toward the other of said pistons to express the whey from the sludge and to compress the curd into a block and, thereafter, both pistons can be moved together toward the upper end of said inclined first vessel, said first vessel having a downwardly facing opening adjacent said upper end of the first vessel, a second vessel extending parallel to said first vessel and disposed below the latter, with said second vessel having a cross-sectional area substantially greater than that of said first vessel, said second vessel having an upwardly facing opening, means connecting said downwardly and upwardly facing openings so that, when both pistons of said first piston are moved toward said upper end, a block of curd compressed therebetween can drop through said openings into said second vessel, and a perforated piston slidable in said second vessel to cause the curd of a compressed block received in the second vessel to flow laterally in relation to said piston in the second vessel, thereby developing the essential fibrous structure in the curd and promoting the removal from the curd of small air bubbles and whey.

4. A machine as in claim 3; wherein said second vessel has an open upper end, and further comprising an additional piston slidable into and out of said open upper end of the second vessel so that said additional piston can be positioned in said upper end during lateral flowing of the curd resulting from the movement of the first mentioned piston in said second vessel toward said upper end and, thereafter, said first piston and said additional piston in the second vessel can be moved together in the direction toward said upper end until said additional piston emerges from said open upper end of said second vessel to permit removal of the compressed block of curd from between said first and additional pistons of said second vessel.

5. A machine as in claim 3; wherein the lateral width of said second vessel is at least as large as the lateral width of said first vessel.

6. A machine as in claim 3; wherein said first vessel has a circular cross-section and said second vessel has a cross-section consisting of two complementary semi-circular sections with the same diameter as said circular cross-section and a rectangular section between said semi-circular sections.

7. A machine as in claim 3; further comprising a whey trough having the lower end portion of said first vessel positioned therein, said lower end portion having perforations through which the whey from the sludge of curd and whey supplied to said first vessel can enter said trough, and means for regulating the level of whey in said trough.

8. A machine as in claim 3; further comprising side walls extending upwardly from the opposite sides of said first vessel along said lower end portion of the latter and an end wall extending between said side walls at the lower end of said first vessel, said first vessel having perforations in said lower end portion opening upwardly between said side walls so that said lower end portion of the first vessel and said side and end walls define a trough for collecting the whey of the sludge supplied to said first vessel.

9. A machine as in claim 8; further comprising a splash plate resting on the top edges of said side walls and fitting closely, at one end, against said first vessel at a location above said perforations of the latter.

References Cited in the file of this patent

UNITED STATES PATENTS

| | | |
|---|---|---|
| 1,968,384 | Gaunt | July 31, 1934 |
| 2,451,301 | O'Connell | Oct. 12, 1948 |